United States Patent [19]
Staffel et al.

[11] Patent Number: 5,277,887
[45] Date of Patent: Jan. 11, 1994

[54] PROCESS FOR THE PREPARATION OF AMMONIUM POLYPHOSPHATE

[75] Inventors: Thomas Staffel, Hürth; Wolfgang Becker, Erftstadt; Herbert Neumann, Bergheim, all of Fed. Rep. of Germany

[73] Assignee: Hoechst Aktiengesellschaft, Fed. Rep. of Germany

[21] Appl. No.: 951,406

[22] Filed: Sep. 25, 1992

[30] Foreign Application Priority Data

Oct. 12, 1991 [DE] Fed. Rep. of Germany ....... 4133811

[51] Int. Cl.$^5$ .............................................. C01B 25/40
[52] U.S. Cl. ..................................... 423/305; 423/315
[58] Field of Search ................................. 423/305, 315

[56] References Cited

U.S. PATENT DOCUMENTS

| | | |
|---|---|---|
| 3,978,195 | 8/1976 | Schrodter et al. |
| 5,043,151 | 8/1991 | Staffel et al. ........................ 423/315 |
| 5,158,752 | 10/1992 | Staffel et al. ........................ 423/305 |
| 5,165,904 | 11/1992 | Staffel et al. ........................ 423/315 |

FOREIGN PATENT DOCUMENTS 4006862 9/1991 Fed. Rep. of Germany .

*Primary Examiner*—Wayne Langel
*Attorney, Agent, or Firm*—Connolly & Hutz

[57] ABSTRACT

To prepare essentially water-insoluble, long-chain ammonium polyphosphate, in a first stage, ammonium orthophosphate and phosphorus pentoxide are reacted in the presence of gaseous ammonia in a reactor equipped in its interior with mixing, kneading and comminution apparatus, until the drive motor of the reactor passes through the second current peak in its current consumption/time diagram. In a second stage, the material discharged from the reactor is then fed to a disk dryer, the heating disks of which are maintained at temperatures of 240° to 300° C., whereas its lower cooling disk has temperatures of 5° to 45° C. The material, which covers the disks of the disk dryer at a layer thickness of 5 to 20 mm, has a residence time of 35 to 70 minutes in the disk dryer, while ammonia-containing gas is continuously passed through the disk dryer. Finally, the ammonia-containing gas exiting the disk dryer is freed from water vapor contained therein by condensation and the ammonia-containing gas is reheated prior to its entry into the disk dryer.

7 Claims, 1 Drawing Sheet

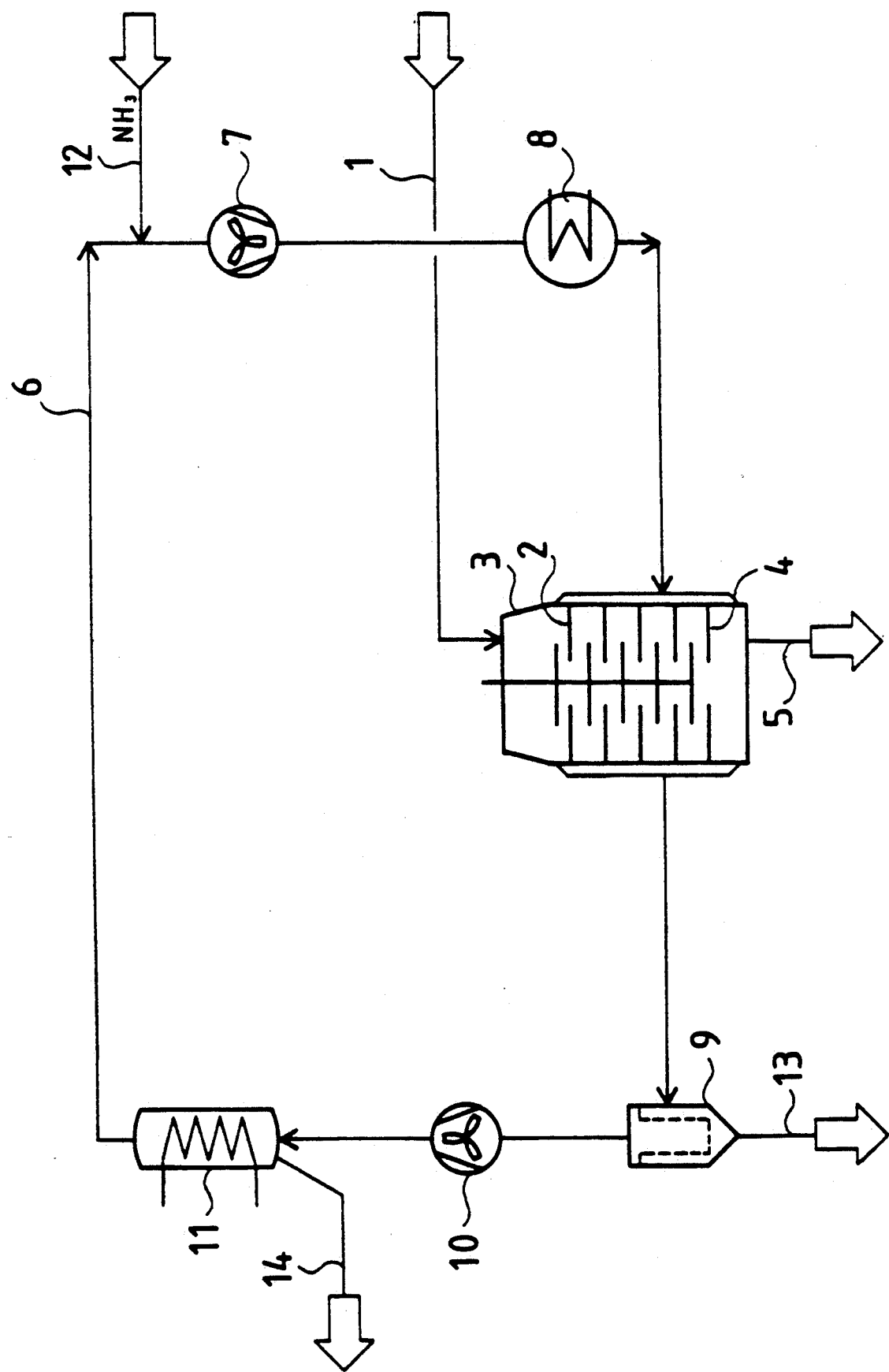

PROCESS FOR THE PREPARATION OF AMMONIUM POLYPHOSPHATE

The present invention relates to a process for the preparation of essentially water-insoluble, long-chain ammonium polyphosphate, where, in a first stage, ammonium orthophosphate and phosphorus pentoxide are reacted in the presence of gaseous ammonia in a reactor equipped in its interior with mixing, kneading and comminution apparatus until the drive motor of the reactor passes through the second current peak of its current consumption/time diagram and in a second stage the material discharged from the reactor is fed to a disk dryer.

U.S. Pat. No. 3,978,195 discloses a process for the preparation of essentially water-insoluble, long-chain ammonium polyphosphates, in which equimolar amounts of ammonium orthophosphate and phosphorus pentoxide are reacted in the presence of ammonia at temperatures between 170V and 350° C. in a reactor equipped with mixing apparatus with continuous mixing, kneading and comminution; in the first phase, with a pasty reaction mixture, a relatively low rotary speed s used and in a second phase, after a finely divided product has formed, a high rotary speed is used.

In the unit described in German Offenlegungsschrift 4,006,862 for the preparation of essentially water-insoluble, long-chain ammonium polyphosphates from ammonium orthophosphate, phosphorus pentoxide and ammonia, the discharge line of the reactor having in its interior mixing, kneading and comminution apparatus is connected to a mixing apparatus in a mass flow-connected manner, which mixing apparatus can be a rotary kiln, a disk dryer, a fluidized bed reactor or a mixer/kneader. In this case, a discharge means located in the discharge line is opened when the current consumption/time diagram of the drive motor of the reactor has passed through the second time peak.

It has now proved to be advantageous for the mixing apparatus used in the second phase of the preparation of ammonium polyphosphates to be a disk dryer.

The present invention relates in detail to a process for the preparation of essentially water-insoluble, long-chain ammonium polyphosphates, where, in a first stage, ammonium orthophosphate and phosphorus pentoxide are reacted in the presence of gaseous ammonia in a reactor having mixing, kneading and comminution apparatus and where, in a second stage, the material discharged from the reactor is fed to a disk dryer, wherein the material covers the disks of the disk dryer at a layer thickness of 5 to 20 mm; wherein the heating disks of the disk dryer are held at temperatures of 240° to 300° C., while its lower cooling disk has temperatures of 5° to 45° C.; wherein the material has a residence time of 35 to 70 minutes in the disk dryer; wherein ammonia-containing gas is continuously passed through the disk dryer; wherein the ammonia-containing gas exiting the disk dryer is freed from water vapor contained therein by condensation; and wherein the ammonia-containing gas is heated prior to its entry into the disk dryer.

BRIEF DESCRIPTION OF THE DRAWINGS

The sole FIGURE of the Drawings diagrammatically illustrates a unit for carrying out the process according to the invention.

The process according to the invention can, if required, be additionally configured in such a manner that a) the material has a residence time of 45 to 60 minutes in the disk dryer;
b) the ammonia-containing gas is passed in cross-current flow through the disk dryer (cf. the figure);
c) the ammonia-containing gas is passed in counter-current flow through the disk dryer;
d) the ammonia-containing gas is passed in co-current flow through the disk dryer;
e) ammonia is additionally admixed to the ammonia-containing gas freed from water vapor;
f) the ammonia-containing gas is heated to temperatures of 100° to 300° C. prior to its entry into the disk dryer;
g) the ratio of the total surface area of the heating disks (in $m^2$) to the rate of ammonia-containing gas flowing through the disk dryer (in $m^3/h$) is 1 : (5 to 15);
h) the ratio as described in g) is 1 : (8 to 12).

In the process according to the invention, the residence time in the disk dryer, at up to 75 minutes, is considerably shorter than the heating time required in the prior art of at least 4 hours in a reactor equipped with mixing, kneading and comminution apparatus.

In the accompanying drawing, a unit for carrying out the process according to the invention is diagrammatically illustrated.

Material discharged from the reactor is passed via a feed line 1 to the upper heating 9 disk 2 of the disk dryer 3, whereas the material treated in the disk dryer is finally passed to the cooling disk 4 and can then be removed as product via the withdrawal tube 5. A first fan 7, a heating device 8, the disk dryer 3, a filter 9, a second fan 10 and a condenser 11 are arranged sequentially in the flow direction in the circulation 6 for ammonia-containing gas. Furthermore, an ammonia feed tube 12 opens into the circulation line 6. Finally, a solids tube 13 descends from the base of the filter 9, while the condenser 11 is connected to a condensate drain line 14

Ammonium polyphosphate (®Exolit 422) in accordance with specifications must have in a 10% aqueous suspension a pH of 5.5±1 and an acid value of at most 1 mg of KOH/g and may contain at most 10% of water-soluble fractions at 25° C. (cf. the Hoechst AG leaflet:

"®Exolit auf Ammoniumpolyphosphat-Basis: Für halogenfreie Flammschutzsysteme der Zukunft" [Ammonium polyphosphate-based ® Exolit: for halogen-free fire protection systems of the future]; 1989). In the following examples, the ammonium polyphosphates obtained are compared with the material conforming to specifications.

EXAMPLE 1

Comparison Example 50 kg of a crumbly material were loaded per hour into a disk dryer having seven heating disks and one cooling disk, which material had been obtained by reaction of ammonium orthophosphate and phosphorus pentoxide in the presence of gaseous ammonia in a reactor equipped with mixing, kneading and comminution apparatus. The layer thickness of the material on the disks was 13 mm. The heating disks were maintained at a temperature of about 270° C., the cooling disk had a temperature of 25° C. 70 $m^3$ of ammonia-containing gas (at least 50% by volume of $NH_3$) flowed through the disk dryer per hour, corresponding to a ratio of disk surface area to gas rate of 1:10. 2 $m^3$ of fresh ammonia per hour were fed into the circulation line. The residence time of the material in the disk dryer was 30 minutes. Characteristics of four samples of the ammonium polyphosphate obtained can be seen in Table 1.

TABLE 1

| No. | pH | Acid value mg of KOH/g | Water-soluble fraction % |
|---|---|---|---|
| 1 | 4.3 | 1.1 | 9.0 |
| 2 | 4.4 | 1.3 | 8.8 |
| 3 | 4.7 | 1.1 | 7.9 |
| 4 | 4.4 | 1.2 | 8.3 |

This ammonium polyphosphate does not conform to specification.

EXAMPLE 2

According to the Invention

Example 1 was repeated, except that the residence time of the material in the disk dryer was 45 minutes. Characteristics of four samples of the ammonium polyphosphate obtained are given in Table 2.

TABLE 2

| No. | pH | Acid value mg of KOH/g | Water-soluble fraction % |
|---|---|---|---|
| 5 | 6.5 | 0.13 | 5.0 |
| 6 | 6.4 | 0.18 | 4.8 |
| 7 | 6.4 | 0.16 | 5.1 |
| 8 | 6.5 | 0.14 | 5.0 |

The quality of this ammonium polyphosphate conforms to specification.

EXAMPLE 3

According to the Invention

Example 1 was repeated, except that the layer thickness of the material on the disks was 10 mm and the residence time of the material in the disk dryer was 45 minutes. Characteristics of four samples of the ammonium polyphosphate obtained are given in Table 3.

TABLE 3

| No. | pH | Acid value mg of KOH/g | Water-soluble fraction % |
|---|---|---|---|
| 9 | 6.5 | 0.31 | 4.5 |
| 10 | 6.5 | 0.37 | 4.6 |
| 11 | 6.5 | 0.28 | 4.1 |
| 12 | 6.5 | 0.31 | 4.3 |

The quality of this ammonium polyphosphate conforms to specification.

EXAMPLE 4

According to the Invention

Example 1 was repeated, except that the layer thickness of the material on the disks was 15 mm and the residence time of the material in the disk dryer was 60 minutes. Characteristics of four samples of the ammonium polyphosphate obtained are given in Table 4.

TABLE 4

| No. | pH | Acid value mg of KOH/g | Water-soluble fraction % |
|---|---|---|---|
| 13 | 6.4 | 0.42 | 4.0 |
| 14 | 6.3 | 0.45 | 4.3 |
| 15 | 6.4 | 0.48 | 4.8 |
| 16 | 6.4 | 0.39 | 4.2 |

The quality of this ammonium polyphosphate conforms to specification.

EXAMPLE 5

According to the Invention

Example 1 was repeated, except that the layer thickness of the material on the disks was 15 mm and the residence time of the material in the disk dryer was 45 minutes. Characteristics of four samples of the ammonium polyphosphate obtained are given in Table 5.

TABLE 5

| No. | pH | Acid value mg of KOH/g | Water-soluble fraction % |
|---|---|---|---|
| 17 | 6.4 | 0.34 | 4.2 |
| 18 | 6.1 | 0.42 | 5.0 |
| 19 | 6.2 | 0.38 | 4.3 |
| 20 | 6.3 | 0.48 | 4.5 |

The quality of this ammonium polyphosphate conforms to specification.

We claim:

1. A process for the preparation of essentially water-insoluble, long-chain ammonium polyphosphate in a reactor having a vertically arranged shaft with mixing, kneading and comminution tools fastened to said shaft, said shaft being rotatable by a drive motor equipped with a power consumption meter connected to said drive motor, which meter produces a power consumption/time diagram showing a first peak and a second peak during each batch in the reactor which comprises: in a first stage, reacting ammonium orthophosphate and phosphorus pentoxide in the presence of gaseous ammonia in said reactor, until its drive motor passes through the second peak in its power consumption/time diagram; in a second stage, the material discharge from the reactor is fed to a disk dryer being provided with heating disks and a lower cooling disk, said heating disks being held at temperatures of 240° to 300° C. and said cooling disk having temperatures of 5° to 45° C.; the material covering the disks at a layer thickness of 5 to 20 mm has a residence time of 35 to 70 minutes in the disk dryer; ammonia-containing gas is continuously passed through the disk dryer; the ammonia-containing gas exiting the disk dryer is freed from water vapor contained therein by condensation; the ammonia-containing gas freed from water vapor is heated to temperatures of 100° to 300° C. prior to its entry into the disk dryer; and the ratio of the total surface area of all the heating disks (in m2) to the rate of ammonia-containing gas flowing through the disk dryer (in m3/h) is 1 : (5 to 15).

2. The process as claimed in claim 1, wherein the material has a residence time of 45 to 60 minutes in the disk dryer.

3. The process as claimed in claim 1, wherein the ammonia-containing gas is passed in cross-current flow through the disk dryer.

4. The process as claimed in claim 1, wherein the ammonia-containing gas is passed in counter-current flow through the disk dryer.

5. The process as claimed in claim 1, wherein the ammonia-containing gas is passed in co-current flow through the disk dryer.

6. The process as claimed in claim 1, wherein ammonia is additionally admixed to the ammonia-containing gas freed from water vapor.

7. The process as claimed in claim 1, wherein the ratio is 1 : (8 to 12).

* * * * *